United States Patent Office 3,437,593
Patented Apr. 8, 1969

3,437,593
ANTISEIZE SEALING COMPOUND
Peter N. Bellavin, 113 E. Franklin Ave., Wilmington
Manor, New Castle, Del. 19720
No Drawing. Filed May 25, 1966, Ser. No. 553,266
Int. Cl. C10m 7/06
U.S. Cl. 252—13                           4 Claims

ABSTRACT OF THE DISCLOSURE

The subject invention relates to a novel and improved composition having superior antiseize, sealing and other properties, particularly in liquid oxygen systems. The composition includes an intermixture of tetrafluoroethylene, trifluorovinyl chloride, asbestos and molybdenum disulfide. Polychlorotrifluoroethylene may also be included as an ingredient to control the viscosity of the composition.

---

The invention described herein may be manufactured and used by or for the Government of the United States of America for governmental purposes without the payment of any royalties thereon or therefor.

Many types of antiseize sealing compositions have been devised and used for various purposes in the past. With increased use of liquid oxygen in aircraft and aerospace systems, however, antiseize sealing compounds used heretofore have often been found ineffective, inconvenient in use, and potentially hazardous. Some currently used antiseize sealing compositions are too thin in consistency to prevent gas leakage in pipe components at extreme pressures and temperatures. Other currently known compositions of this kind are sensitive to impact in the presence of liquid oxygen. Still others require special thorough mixing procedures prior to use. With others, the cleaning of surfaces to which the composition has been applied is particularly cumbersome and difficult.

It is therefore a principal object of the present invention to provide a novel and improved antiseize sealing composition which is highly effective and reliable in use.

It is a further object of the present invention to provide a novel and improved antiseize sealing composition which exhibits low sensitivity to impact in the presence of liquid oxygen.

It is a further object of the present invention to provide a novel and improved antiseize sealing composition which prevents thread seizure and exhibits the lubricity of solid lubricants.

It is a further object of the present invention to provide a novel and improved antiseize sealing composition which forms no shreds or flakes about threads of disassembled components and thereby minimizes the possibility of system contamination.

It is a further object of the present invention to provide a novel and improved antiseize sealing composition which requires no drying time or curing at elevated temperatures after application to threaded components.

It is a further object of the present invention to provide a novel and improved antiseize sealing composition which can be removed with minimum effort.

These and other objects of the invention are accomplished by applying on the threads of components to be interconnected a composition which includes a tetrafluoroethylene polymer, a halogenated hydrocarbon polymer, asbestos, and molybdenum disulfide. The tetrafluoroethylene polymer functions as a lubricant and sealer in the composition. It also tends to reduce the sensitivity of the composition to impact in the presence of liquid oxygen. The tetrafluoroethylene polymer is used in the form of a finely divided solid with a particle size of approximately 5 microns. It has a crystalline melting point of 300° C. and a molecular weight of approximately 3700.

The tetrafluoroethylene polymer is mixed into the halogenated hydrocarbon polymer so that it is thoroughly distributed therein. The halogenated hydrocarbon polymer which is used is trifluorovinyl chloride. This component of the composition is completely free from hydrogen and is greaselike in texture. The density of this component is from 1.88 gm./cc. to 2.0 gm./cc. Fluorine and chlorine account for 80% of its molecule. It has an ASTM unworked penetration of 183 mm., at 77° F. and 190 mm. at 125° F., and has an ASTM dropping point at more than 400° F. The trifluorovinyl chloride polymer functions as another lubricant and a binder in the composition of the invention. It also tends to reduce the sensitivity of the composition to impact in the presence of liquid oxygen.

Short asbestos fibers are then thoroughly mixed into and distributed throughout the mixture of the tetrafluoroethylene and trifluorovinyl chloride. The asbestos in the composition serves as a filler and an additional binder therefor. Molybdenum disulfide of a technical grade which is a lubricant that is also compatible with liquid oxygen in the presence of the halocarbon ingredients of the composition is then mixed in with the other ingredients of the composition.

A polymer of polychlorotrifluoroethylene may then be added to the composition as a lubricant. The polymer of polychlorotrifluoroethylene is a saturated completely halogenated low molecular weight inert, oxygen compatible oil with a $-140°$ F. pour point and 600 cs. viscosity at $-100°$ F. The general formula of the polychlorotrifluoroethylene polymer is $-(CF_2-CFCl)_n-$. Addition of this final ingredient to the composition thins out and controls the viscosity of the composition when it is desired to do so. It also tends to further reduce the sensitivity of the composition to impact in the presence of liquid oxygen.

The following specific examples of the improved composition are provided to further illustrate the invention:

EXAMPLE 1

Ingredients:                                Parts by weight
  Tetrafluoroethylene (solids of Vydax AR; Du
    Pont) _____ 31.8
  Trifluorovinyl chloride (Fluorolube GR–470;
    Hooker Chemical) _____ 58.8
  Asbestos _____ 5.9
  Molybdenum disulfide _____ 3.5

EXAMPLE 2

Ingredients:                                Parts by weight
  Tetrafluoroethylene (solids of Vydax AR; Du
    Pont) _____ 28.8
  Trifluorovinyl chloride (Fluorolube GR–470;
    Hooker Chemical) _____ 55.7
  Asbestos _____ 5.8
  Molybdenum disulfide _____ 5.8
  Polychlorotrifluoroethylene (Halocarbon 208—
    Halocarbon Products) _____ 3.9

EXAMPLE 3

Ingredients:                                      Parts by weight
  Tetrafluoroethylene (solids of Vydax AR;
    Du Pont) _____ 27.8
  Trifluorovinyl chloride (Fluorolube GR–470;
    Hooker Chemical) _____ 61.0
  Asbestos _____ 5.6
  Molybdenum disulfide _____ 5.6

Impact sensitivity, antiseize and sealing, corrosion, flammability and odor tests were performed on each of the above described examples of the invention as well as on four other antiseize sealant compounds presently in use. Results of these tests are shown in Table I. The four tested compounds presently in use are identified in Table I as compounds A–D.

TABLE I

| Compound | Antiseize and sealing test | Threshold value, ft. lbs./in.² | Corrosion | | Flammability | Odor |
|---|---|---|---|---|---|---|
| | | | Aluminum alloy | Brass | | |
| A | F | 69 (F) | S | SS | S | S |
| B | F | 92 (F) | S | SS | S | S |
| C | F | 116 (S) | S | SS | S | S |
| D | F | 139 (S) | S | SS | S | S |
| Example 1 | S | 554 (S) | S | S | S | S |
| Example 2 | S | 508 (S) | S | S | S | S |
| Example 3 | S | 497 (S) | S | S | S | S |

S—Satisfactory, F—Fails, SS—Slight staining.

The impact sensitivity test provided a means of testing the various compounds to detonation by impact when samples of the same were immersed in liquid oxygen. In this test, a plummet weighing 2000 grams was dropped from various heights on the specimen or sample immersed in liquid oxygen. The impact sensitivity of the sample expressed in ft. lbs./sq. in. was considered proportional to the height at which the 2000 gram plummet caused detonation. Detonation at less than 100 ft. lbs./sq. in., the detonation threshold value of polytetrafluoroethylene in tape form that is widely used, was considered a test failure. It will be noted in Table I that the detonation threshold values of each of the Examples 1–3 of the invention were substantially better than those of the four compounds A–D.

In the antiseize and sealing test, the sample compounds were applied to ⅛, ¼ and ½ inch brass and aluminum male and female threaded fittings. The fittings were assembled using torques of 150 to 1800 inch pounds to tighten the same. They were then charged with nitrogen to a pressure of 2000 p.s.i., immersed in water and examined for leakage. After a 24 hour period at room temperature, they were checked for loss of pressure and again immersed in water and examined for leakage. The assemblies were then subjected to a temperature of 160° F. for 48 hours followed by 48 hours at a temperature of −65° F. This cycle was repeated three times, pressure drops and/or leakage being checked at the end of each temperature interval. A loss of pressure in excess of 100 p.s.i. was considered a sample failure. The assemblies were then disassembled using a torque of not more than 25% greater than that used for the initial assembly. Fresh compound was then applied to the threads and the assemblies were reassembled using double the original assembling torque. After four hours, they were again disassembled using a torque of not more than 10% greater than that used in the reassembly. The threads of the fittings were then examined for marring or galling. As will be noted in Table I, each of the four compounds A–D failed the antiseize and sealing test whereas each of the compounds of Examples 1–3 were found to be satisfactory.

In the corrosion test, the various compounds were applied to mechanically polished one inch square panels of aluminum and brass. After 48 hours at room temperature, the compounds were removed with acetone. The panels were then examined for corrosion as evidenced by discoloration or pitting under a binocular microscope at a magnification of 20 diameters. As will be noted in Table I, the compounds of Examples 1–3 were all as little or less corrosive than the compounds A–D.

In the flammability test, the various compounds were applied to a 20 mesh screen over an area of three inches in diameter. The underside of the screen was then heated with a Bunsen burner such that the burner flame did not project through the screen. As the compounds began to decompose and volatilize, a second burner was used to attempt to ignite the vapors. The compounds of A–D as well as those of Examples 1–3 passed the test.

In the odor test, the various compounds were placed in 2 ounce containers and examined for objectionable odors by smelling the compounds immediately after they had been thoroughly stirred. Again the compounds of A–D as well as those of Examples 1–3 passed this test.

What is claimed is:

1. An antiseizing sealing compound comprising:
   (a) about from 27 to 32 percent by weight of a polymer of tetrafluoroethylene having a molecular weight of approximately 3700;
   (b) about from 58 to 61 percent by weight of a polymer of trifluorovinyl chloride having a density of from 1.88 gm./cc. to 2.0 gm./cc.;
   (c) about from 5 to 6 percent by weight of asbestos;
   (d) and about from 3 to 6 percent by weight of molybdenum disulfide.

2. The composition substantially as described in claim 1 further including about 3.9 percent by weight of a polymer of polychlorotrifluoroethylene having a viscosity of 600 cs. at −100° F.

3. The composition substantially as described in claim 1 wherein there are 31.8 parts by weight of the tetrafluoroethylene polymer, 58.8 parts by weight of the trifluorovinyl chloride polymer, 5.9 parts by weight of asbestos and 3.5 parts by weight of molybdenum disulfide.

4. The composition substantially as described in claim 1 wherein there are 27.8 parts by weight of the tetrafluoroethylene polymer, 61 parts by weight of the trifluorovinyl chloride polymer, 5.6 parts by weight of asbestos and 5.6 parts by weight of molybdenum disulfide.

References Cited
UNITED STATES PATENTS

| 2,809,397 | 10/1957 | Zagorski et al. | 252—13 |
| 3,011,221 | 12/1961 | Howell | 252—12 |
| 3,069,387 | 12/1962 | Allen et al. | 252—58 |
| 3,000,846 | 9/1961 | Runton et al. | 260—41 |
| 3,213,024 | 10/1965 | Blake et al. | 252—21 |

DANIEL E. WYMAN, *Primary Examiner.*

I. VAUGHN, *Assistant Examiner.*

U.S. Cl. X.R.

252—25